US 6,628,467 B2

(12) United States Patent
Cyrusian (10) Patent No.: US 6,628,467 B2
(45) Date of Patent: Sep. 30, 2003

(54) INPUT/OUTPUT MULTIPLEX SYSTEM FOR A READ/WRITE CHANNEL IN A DISK DRIVE

(75) Inventor: Sasan Cyrusian, Scotts Valley, CA (US)

(73) Assignee: Infineon Technologies AG, Munich (DE)

( * ) Notice: Subject to any disclaimer, the term of this patent is extended or adjusted under 35 U.S.C. 154(b) by 264 days.

(21) Appl. No.: 09/865,611

(22) Filed: May 25, 2001

(65) Prior Publication Data

US 2002/0176189 A1 Nov. 28, 2002

(51) Int. Cl.$^7$ ................................................ G11B 5/09
(52) U.S. Cl. .............................. 360/46; 360/62; 360/31
(58) Field of Search .............................. 360/46, 61, 53, 360/62, 32, 31, 65, 67, 68; 710/1, 36, 74, 72; 324/210, 212, 226

(56) References Cited

PUBLICATIONS

"Synchronous Recording Channels—PRML & Beyond", rev. 5.61 14.E. 18, 1999, published by Knowledge Tek, Inc., Broomfield, Colorado.
"PRML: Seagate Uses Space Age Technology" available on the Internet at http://www.seagate.com/support/kb/disc/prml.html, 2 pages, last accessed Apr. 9, 2001.
"Technologies—PRML" available on the Internet at http://www.idema.org/about/industry/ind_tech_prml.html, 1 page, last accessed Apr. 9, 2001.
"Reference Guide—Hard Disk Drives" available on the Internet at http://www.storagereview.com/guide2000/ref/hdd, 13 pages, last accessed Apr. 9, 2001.
"MR and PRML: Technologies in Synergy" available at on the Internet at http://www.lionsgate.com/Home/Baden/public_html_index/SCSI/Quantum_White_Papers/MR_Head/MR, 4 pages, last accessed Apr. 9, 2001.
"A Tutorial on Convolutional Coding with Viterbi Decoding" available on the Internet at http://pw1.netcom.com/~chip.f/viterbi/tutorial.html, 10 pages, last accessed Apr. 9, 2001.

*Primary Examiner*—Alan T. Faber
(74) *Attorney, Agent, or Firm*—Richard K. Clark; Brinks Hofer Gilson & Lione (57) ABSTRACT

This invention provides a read/write channel with a multiplex input/output system for a disk drive, which may have one or more magnetic disks, one or more read/write heads, and a read/write channel. The read/write channel may comprise a multiplex input/output (I/O) terminal, a write output driver, and a digital to analog converter. The read/write channel may be implemented on an integrated circuit. The multiplex input/output system may send different signals or voltages through the same input/output terminal at essentially at the same time or different periods of time.

19 Claims, 3 Drawing Sheets

INPUT/OUTPUT MULTIPLEX SYSTEM FOR A READ/WRITE CHANNEL IN A DISK DRIVE

FIELD

This invention generally relates to disk drives and other data storage devices. More particularly, this invention relates to disk drives having read/write channels with multiple input and output signals.

BACKGROUND

Disk drives are used as data storage components for computer systems and other electronic devices. Disk drives include computer hard disk drives, fixed disk drives, and the like. In general, disk drives have lower costs, higher storage capacities, higher reliability, lower power consumption, higher data transfer speed, and smaller physical size than other data storage devices.

A disk drive usually has one or more rotating magnetic disks encased within a housing. The disk drive includes various components for reading and writing data onto the magnetic disks and for interfacing with other devices. Typically, one or more read/write heads are positioned above the magnetic disks to read and write data. The read/write heads may be positioned on each side of a magnetic disk. The read/write head essentially forms the interface between a magnetic disk and the electronic components of the disk drive.

Each read/write head generates or senses electromagnetic fields or magnetic encodings on the magnetic disk as areas of magnetic flux. The presence or absence of flux reversals in the electromagnetic fields represents the data stored on the magnetic disk. A flux reversal is a change in the magnetic flux on contiguous areas of the magnetic disk. The presence or absence of magnetic flux reversals correspond to binary 1's and 0's of a diagnostic input signal. To "write" data onto a magnetic disk, electronic components receive data from a host device and translate the data into magnetic encodings. The head transfers the magnetic encodings onto a portion of the magnetic disk. To "read" data from the magnetic disk, the head is positioned adjacent to the portion of the magnetic disk having the desired magnetic encodings. The head senses and transfers the magnetic encodings from the magnetic disk. The electronic components translate the magnetic encodings into the data, which is transferred to the host device. The host device may be a personal computer or other electronic equipment. The electronic components may apply error detection and correction algorithms to ensure accurate storage and retrieval of data from the magnetic disk. To improve data storage densities on disk drives, magneto resistive and inductive read/write heads have been developed with increased sensitivity to sense smaller amplitude magnetic signals and with increased signal discrimination.

Typically, a hard drive reads data by "peak detection"—detecting a voltage peak created when a flux reversal on a magnetic disk passes underneath the read/write head. However, a partial response maximum likelihood (PRML) algorithm has been developed to improve peak detection as densities and rotational speeds increase. PRML is implemented in the disk drive electronics to interpret the magnetic signals sensed by the read/write heads. PRML disk drives read the analog waveforms generated by the magnetic flux reversals stored on the disk. Rather than look for peak values to indicate flux reversals, PRML digitally samples the analog waveform (the "partial response" portion of the algorithm) and applies signal processing methodologies to determine the bit pattern represented by the waveform (the "maximum likelihood" portion of the algorithm).

The electric and mechanical components of the disk drive typically include a spindle motor, an actuator assembly, the read/write heads, amplifiers, a read/write channel, and a controller. There may be additional or different components having other configurations. The spindle motor holds and turns the magnetic disks. The actuator assembly positions the read/write heads adjacent to the magnetic disks. The amplifiers increase the signals between the read/write heads and the read/write channel. The controller interfaces between the read/write channel and the host device.

The read/write channel usually is implemented on an integrated circuit, which may be a complementary metal oxide semiconductor (CMOS). The read/write channel uses multiple input/out (I/O) terminals for inputting or outputting signals between the read/write channel and other components in the disk drive. Each read/write channel typically has four I/O terminals—a write I/O terminal, a read I/O terminal, and two test or diagnostic I/O terminals. The write I/O terminal usually is used to output a write analog signal or voltage to the read/write heads. The write analog signal corresponds to the data to be stored on the magnetic disks. The read I/O terminal usually is used to input a read analog signal or voltage from the read/write heads. The read analog signal corresponds to the data stored on the magnetic disks. The diagnostic I/O terminals usually are used to input or output diagnostic or test signals such as an AC test bus output signal, a DC test bus input signal, and analog output signals from a diagnostic digital to analog converter. The read/write channel may have additional I/O terminals to expand or enhance the read and write operations of the disk drive and to perform additional diagnostic tests on the read/write channel.

Each I/O terminal usually has two pins for use with differential signals. With at least four I/O terminals, each read/write channel has at least eight pins. Each pin increases the cost and size of the integrated circuit or CMOS used to implement the read/write channel. Additionally, each pin increases the cost of using the integrated circuit or CMOS in the disk drive. Each pin usually has an external connection to other components in the hard drive. As the number of pins increases, the number of external connections increases.

SUMMARY

This invention provides a read/write channel with a multiplex input/output system for a disk drive. The multiplex input/output system may send different signals or voltages through the same input/output terminal at essentially the same time or different periods of time.

A disk drive with a multiplex input/output system may have a read/write channel implemented on an integrated circuit. The disk drive may have a multiplex input/output (I/O) terminal, a write output driver, and a digital to analog converter. The multiplex input/output (I/O) terminal may be coupled one or more read/write heads. The write output driver may be coupled to provide a write output signal to the multiplex I/O terminal. A digital to analog converter may be coupled to provide an analog output voltage to the multiplex I/O terminal.

A read/write channel with a multiplex input/output system for a disk drive may have a multiplex input/output (I/O) terminal, a write output driver, a digital to analog converter, an analog to digital converter, and a test enable switch. The read/write channel may be implemented on an integrated circuit. The write output driver may be coupled to provide a write output signal to the multiplex I/O terminal. The digital to analog converter may be coupled to provide an analog output voltage to the multiplex I/O terminal. The analog to digital converter may be coupled to receive a diagnostic input voltage through the multiplex I/O terminal. The analog to digital converter may provide a diagnostic output signal in response to the diagnostic input voltage. The test enable switch may be coupled to the multiplex I/O terminal. The test enable switch may provide an output DC test signal to the multiplex I/O terminal. The test enable switch may receive an input DC test signal through the multiplex I/O terminal.

A read/write channel with a multiplex input/output system for a disk drive may have a first multiplex input/output (I/O) terminal, a write output driver, a digital to analog converter, an analog to digital converter (ADC), a test enable switch, a multiplex input/output (I/O) terminal, and a variable gain amplifier. The read/write channel may have partial response maximum likelihood (PRML) encoding and decoding and maybe implemented on a complementary metal oxide semiconductor. The write output driver may be coupled to provide a write output signal to the first multiplex I/O terminal. The digital to analog converter may be coupled to provide an analog output voltage to the first multiplex I/O terminal. The analog to digital converter may be coupled to receive a diagnostic input voltage through the first multiplex I/O terminal. The ADC may provide a diagnostic output signal in response to the diagnostic input voltage. The test enable switch may be coupled to the first multiplex I/O terminal. The test enable switch may provide an output DC test signal to the first multiplex I/O terminal. The test enable switch may receive an input DC test signal through the first multiplex I/O terminal. The variable gain amplifier may be coupled to receive a magnetically generated signal and an analog service signal through the second multiplex I/O converter. The write output signal, the analog output voltage, the diagnostic input voltage, and DC test signals are transmitted through the first multiplex I/O terminal at different times.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 1:
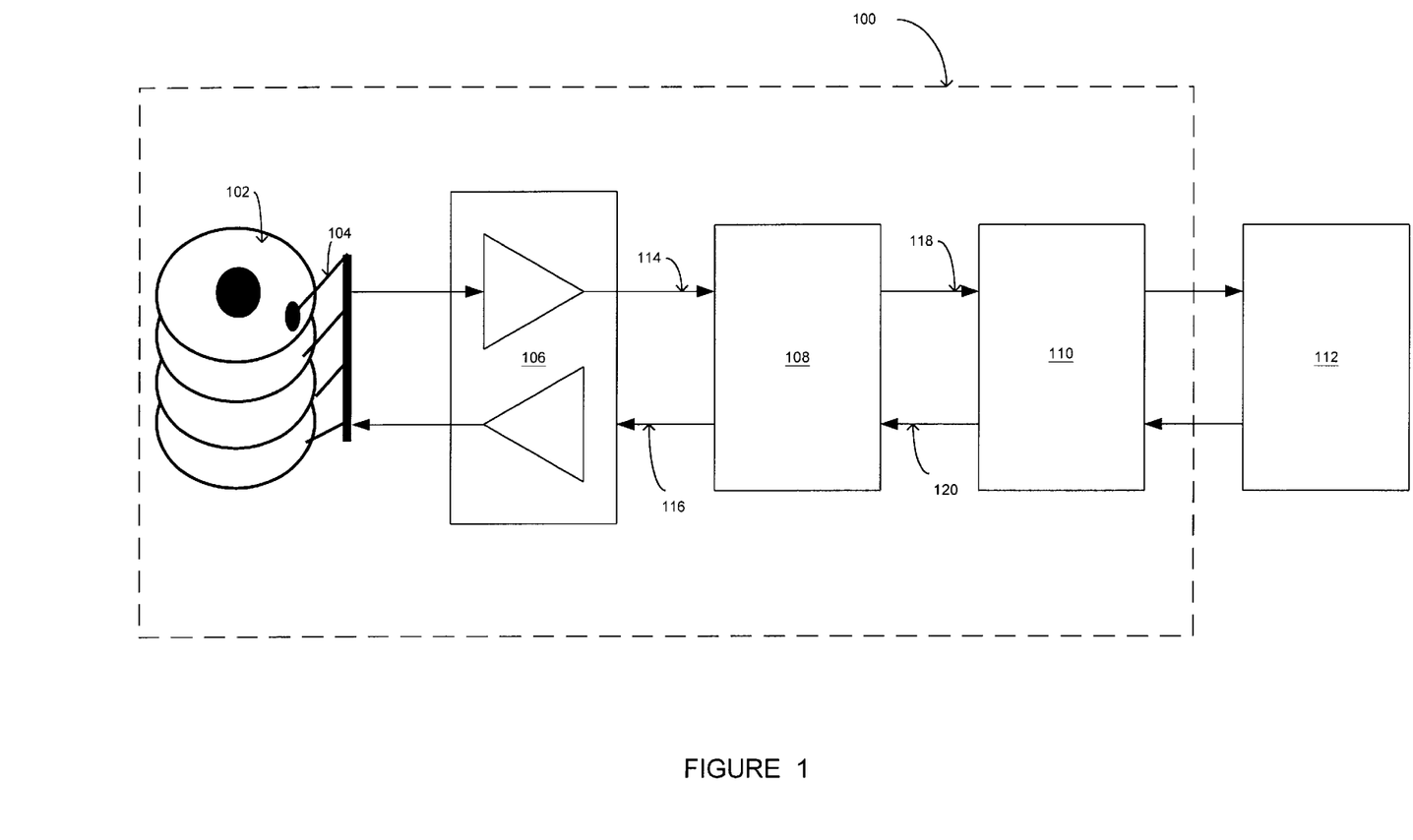
FIG. 1 represents a block diagram of an embodiment of a disk drive having a read/write channel with an input/output multiplex system.

FIG. 1 represents a block diagram of an embodiment of a disk drive 100 having a read/write channel 108 with an input/output multiplex system. The disk drive 100 is coupled to a host device 112. The disk drive 100 may be a hard disk drive, a fixed disk drive, or the like. The host device 112 may be a computer or other electronic device. The disk drive 100 also may include one or more magnetic disks and a spindle motor 102, one or more read/write heads and an actuator assembly 104, amplifiers 106, and a controller 110. The amplifiers 106 may be coupled with the read/write channel 108 via interfaces 114 and 116. The controller 110 may be coupled with the read/write channel 108 via interfaces 118 and 120. "Coupled with" includes directly connected to or indirectly connected with through one or more intermediate components. Such intermediate components may be hardware, software, or a combination of hardware and software. The disk drive 100 may have other configurations and may have fewer or additional components such as an actuator motor control.

The read/write channel 108 converts a diagnostic input signal from the host device 112 into electrical impulses. The read/write heads 104 are operatively disposed adjacent to the magnetic disks 102 to magnetically record data onto the magnetic disks 102 in response to the electrical pulses. The read/write heads 104 also are operatively disposed adjacent to the magnetic disks 102 to sense magnetic flux reversals on the magnetic disks 102. The read/write channel 108 receives an analog waveform generated by the read/write heads 104 in response to the flux reversals on the magnetic disks 102. The read/write channel 108 converts the analog waveform into binary digital data for use by the host device 112. The read/write heads 104 may sense or generate the flux reversals by peak detection, by partial response maximum likelihood (PRML) encoding and decoding, or the like.

To read data from the magnetic disks 102, the host device 112 provides a location identifier to the disk drive. The location identifier identifies the location of the data on the magnetic disks 102. The location identifier may be a cylinder and sector address. The controller 10 receives the location identifier and determines the physical location of the data on the disks 102. The controller 110 causes one or more of the read/write heads 104 to move into the proper position for the data on the magnetic disks 102 to spin adjacent to the read/write heads 104. As the magnetic disks 102 spin, the read/write heads 104 sense the presence or absence of flux reversals on the magnetic disks 102. The read/write heads generate an analog signal in response to the flux reversals. The read/write heads 104 pass the analog signal to the amplifiers 106, which amplify and pass the analog signal to the read/write channel 108 via the interface 114. The read/write channel 108 receives the amplified analog signal from the amplifiers 106 and decodes the amplified analog signal into a diagnostic input signal. The read/write channel 108 passes the diagnostic input signal to the controller 110 via the interface 118. The controller 110 passes the diagnostic input signal to the host device 112, which may have caching or error detection/correction to increase the speed and reliability of the hard drive 100.

To write data onto the magnetic disks 102, the host device 112 provides the controller 110 with the diagnostic input signal and the location to write the diagnostic input signal on the magnetic disks. The location may be a cylinder and sector address. The controller 110 causes the read/write heads 104 to move into the proper location and sends the diagnostic input signal to the read/write channel 108 via interface 120. The read/write channel 108 receives and encodes the diagnostic input signal into analog signals. The read/write channel 108 passes the analog signals to the amplifiers 106 via interface 116. The amplifiers 106 amplify the analog signals and pass the amplified analog signals to the read/write heads 104. The read/write heads 104 impart the magnetic flux reversals onto the magnetic disks 102. The magnetic flux reversals represent the diagnostic input signal.

Figure 2:
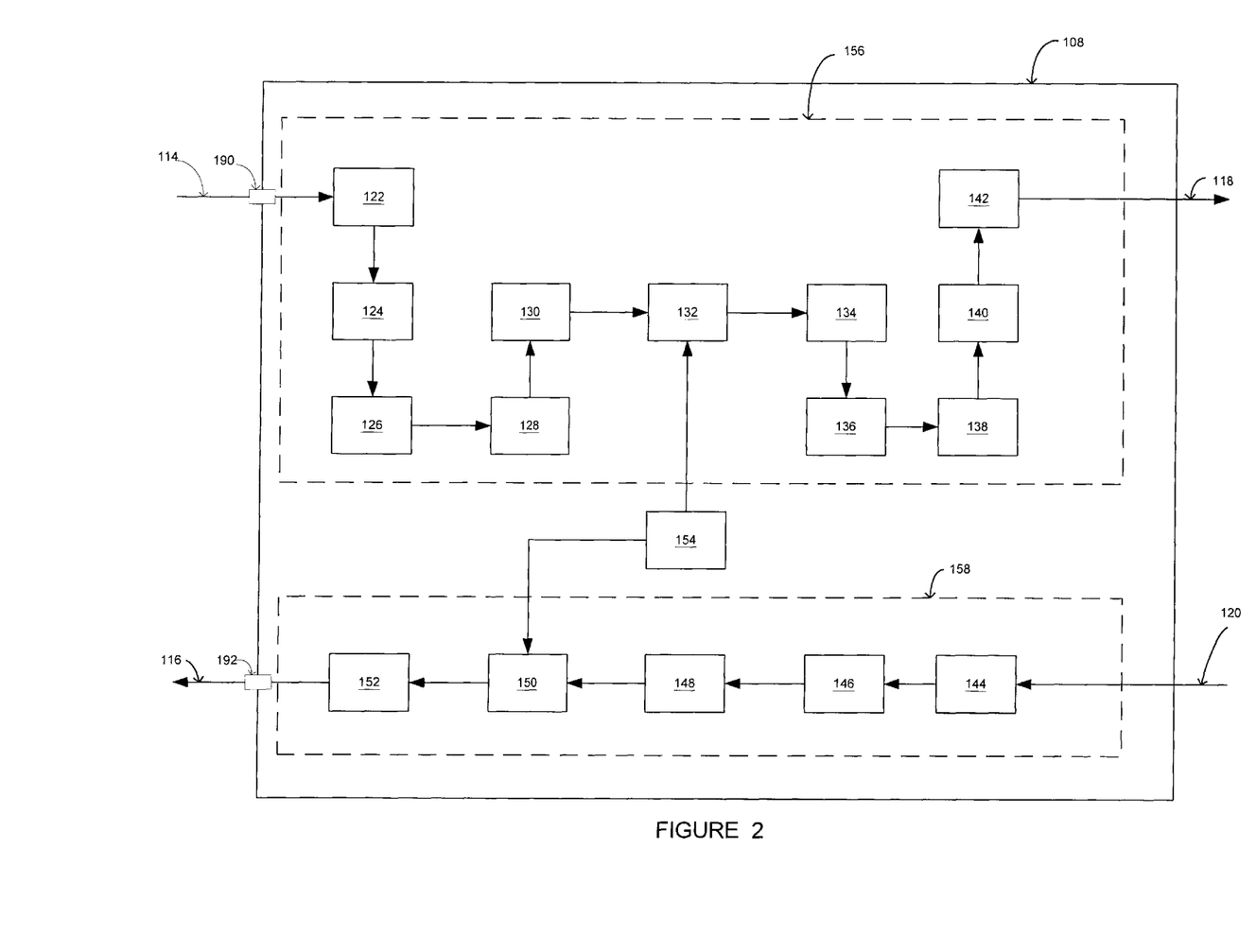
FIG. 2 represents a block diagram of the read/write channel in FIG. 1.

FIG. 2 represents a block diagram of the read/write channel 108 in FIG. 1. The read/write channel 108 has a multiplex input/output system as described below. The read/write channel 108 may be implemented as an integrated circuit, which may comprise a complementary metal oxide semiconductor (CMOS). In one aspect, the read/write channel 108 is implemented as an integrated circuit using a CMOS process at about 0.18 microns. The CMOS may include metal gates and polysilicon gates. The read/write channel 108 may have fewer or additional components and may have other configurations. Other integrated or non-integrated process technologies and other feature sizes may be used. The read/write channel 108 may be integrated with other circuitry comprising the disk drive electronics, such as the disk controller logic.

The read/write channel 108 may be divided into two sections, a read path 156 and a write path 158. The read path 156 may include an impedance and squelch control or input resistance 122, a variable gain amplifier (VGA) 124, a magnetic resistive asymmetry (MRA) linearizer 126, a continuous time filter (CTF) 128, a buffer 130, an analog to digital converter (ADC) 132, a finite impulse response (FIR) filter 134, an interpolated timing recovery (ITR) circuit 136, a Viterbi algorithm detector 138, a parity decoder 140, and a run-length-limited (RLL) decoder 142. The read path 156 may be divided into subparts such as an analog part and a digital part.

The read/write channel 108 receives an amplified analog signal from the read/write heads 104 through a multiplex I/O terminal 190. The amplified analog signal passes through an input resistance 122, which is a switching circuit to attenuate the signal. The attenuated signal passes to the VGA 124, which amplifies the signal. The amplified signal passes to the MRA linearizer 126, which adjusts the signal for distortion created by the recording process such as by a write pre-compensation circuit. The signal passes through the CTF 128 to filter out noise. The CTF 128 may be a low or band pass filter. The filtered signal passes to the ADC 132 via the buffer 130. The ADC 132 samples and converts the analog signal to digital form. The digital signal passes to a FIR filter 134 and then passes to a timing recovery circuit 136. The timing recovery circuit 136 may be connected (not shown) to the FIR filter 134, the MRA linearizer 126 and the VGA 124 in a feedback orientation to adjust these circuits according to the signals received and to compensate for timing. The FIR 134 may comprise a 10-tap or other number of tap FIR filter. The digital signal passes to the Viterbi algorithm detector 138, which determines the binary bit pattern represented by the digital signal using digital signal processing techniques. The Viterbi algorithm detector 138 may comprise a 32-state or other Viterbi processor. The binary data represented by the digital signal passes to the parity decoder 140, which removes the parity bit. The binary data passes to the RLL decoder 142, which decodes the RLL encoding symbols. The binary data passes to the controller 110 via the interface 118.

The write path 158 may include a parallel-to-serial converter 144, a run-length-limited (RLL) encoder 146, a parity encoder 148, a write pre-compensation circuit 150 and a driver circuit 152. The parallel-to-serial converter 144 receives data from the host device 112 via interface 120. The data transmission from the host device 112 may be about eight bits at a time. The converter 144 serializes the input data and sends the serial bit stream to the RLL encoder 146. The RLL encoder 146 encodes the serial bit stream into symbolic binary sequences, which may be according to a run-length limited algorithm for recording on the magnetic disks 102. The RLL encoder may use a 32/33-bit symbol code to ensure flux reversals are properly spaced and long runs of data without flux reversals are not recorded. The RLL encoded data passes to the parity encoder 148, which adds a parity bit to the data. The parity encoder 148 may use an odd parity to ensure long runs of 0's and 1's are not recorded due to the magnetic properties. The parity-encoded data may be subsequently treated as an analog signal rather than a digital signal. The analog signal passes to a write pre-compensation circuit 150, which dynamically adjusts the pulse widths of the bit stream to account for magnetic distortions in the recording process. The adjusted analog signal passes to a driver circuit 152, which passes the signal through the multiplex I/O terminal 192 to the amplifiers 106 via interface 116. The driver circuit 152 drives the read/write heads 104 to record the signal on the magnetic disks 102. The driver circuit 152 may have a pseudo emitter coupled logic (PECL) driver circuit, which generates a differential output to the amplifiers 106.

The multiplex I/O terminals 190 and 192 are connected to provide the multiplex transmission of signals or voltages. Multiplex transmission includes sending different signals or voltages through the same I/O terminal simultaneously or essentially at the same time. For example, time division, code division, or other multiplexing techniques are used, such as when signals have different frequencies. Multiplex transmission also includes sending different signals or voltages through the same I/O terminal in stages—alternate or different periods of time. To stage the signal transmission, the read/write channel 108 may power down or disable competing components for the I/O terminal so the signal or voltage of one component passes through the I/O terminal. A control system (not shown) and clock signals may be used to send the signals at the appropriate stages. Alternatively, the read/write channel 108 may have additional multiplexer devices (not shown) to selectively send the signal. The read/write channel 108 also may have additional or fewer multiplex I/O terminals. The multiplex I/O terminals may be part of different configurations including configurations having one or more I/O terminals. In one aspect, each multiplex I/O terminal has two pins for use with differential signals. Each multiplex I/O terminal may have fewer or additional pins.

The read/write channel 108 may also include a clock synthesizer 154. In one aspect, the clock synthesizer is coupled to the ADC 132 and is coupled to the write pre-compensation circuit 150. The clock synthesizer 154 generates clock signals used for operating the read/write channel 108. The clock synthesizer 154 may be a phased lock loop (PLL) with a voltage-controlled oscillator and various clock dividers to generate the frequencies.

Figure 3:
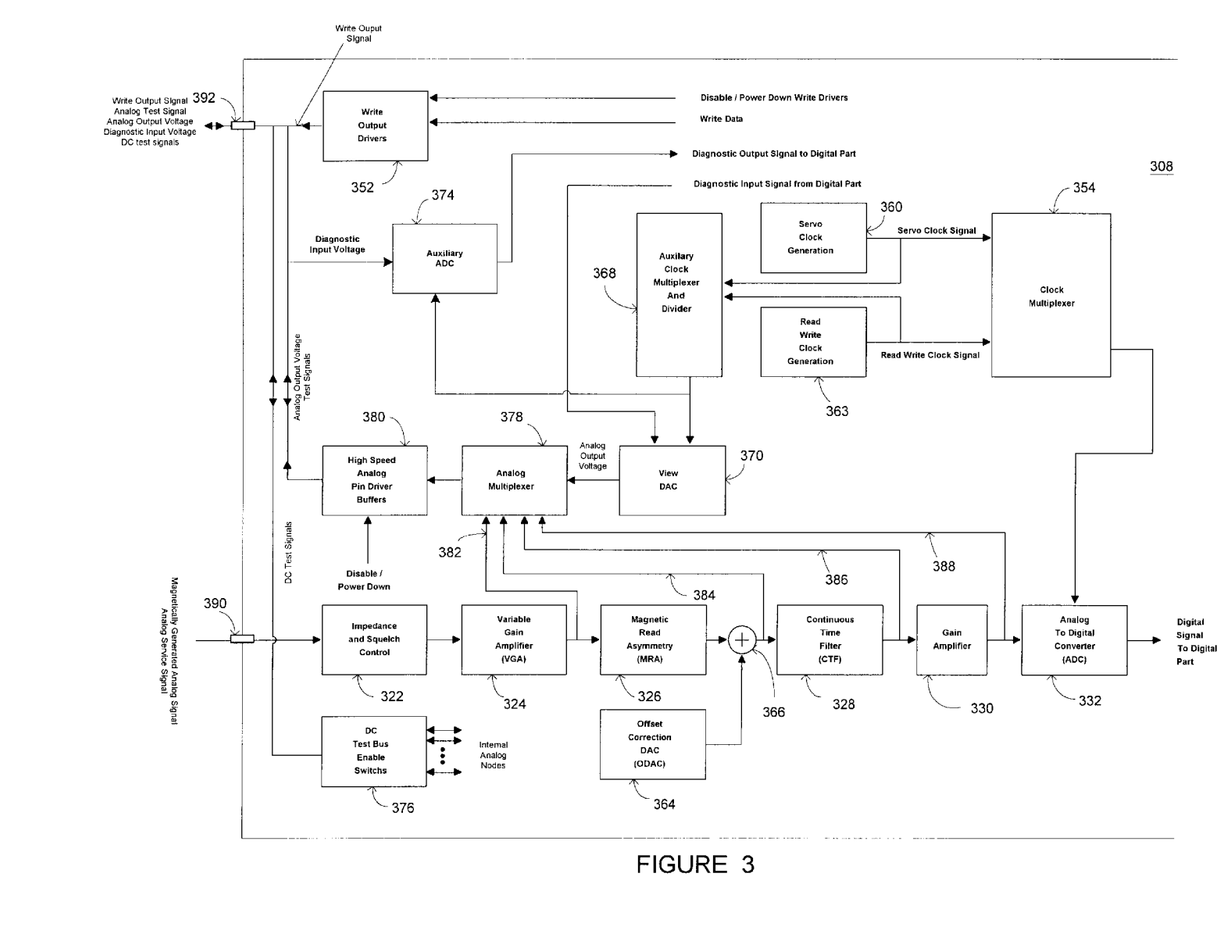
FIG. 3 represents a block diagram of an embodiment of an input/output multiplex system in a read/write channel.

FIG. 3 represents a block diagram of an embodiment of an input/output multiplex system in a read/write channel 308. The read/write channel 308 may include impedance and squelch control 322, a variable gain amplifier (VGA) 324, a magneto-resistive asymmetry linearizer (MRA) 326, an offset correction digital to analog converter (DAC) 364, a summation device 366, a continuous time filter (CTF) 328, a gain amplifier 330, and an analog to digital converter (ADC) 332. The read/write channel 308 also may include a clock multiplexer 354, a servo clock generator 360, a read/write clock generator 362, an auxiliary clock multiplexer 368, a view digital to analog converter (DAC) 370, a digital multiplexer 372, an auxiliary analog to digital converter (ADC) 374, an analog multiplexer 378, a pin driver buffer 380, a write output driver 352, and test bus switches 376. Other components of the read and write paths are not shown. The read/write channel 308 may have fewer or additional components and other configurations.

The read/write channel 308 receives a magnetically generated analog signal or voltage from one or more read/write heads (not shown). The magnetically generated analog signal passes through the multiplex I/O terminal 392 to the impedance and squelch control 322, which may attenuate the signal. The analog signal passes to the VGA 324, which amplifies the magnetically generated signal. The amplified signal passes to the MRA 326, which adjusts the signal for distortion created by the recording process. The adjusted signal is combined at the summation device 366 with an offset correction signal from the offset correction DAC 364. The offset-corrected adjusted signal passes through the CTF 328 to filter out noise and pre-equalize the signal (the filter also has boost in the pass band). The filtered signal passes through the gain amplifier 330, which provides a processed signal to the ADC 332. The clock multiplexer 354 provides a servo clock signal from the servo clock generator 360 and a read/write clock signal from the read/write clock generator 362 to the ADC 332. In response to the clock signals, the ADC 332 samples and converts the analog signal into digital form during and at the appropriate time. The ADC 332 provides the digital signal to the digital part (not shown) of the read/write channel 308.

The view DAC 370 and the auxiliary ADC 374 receive a servo clock signal or a read/write clock signal from the auxiliary clock multiplexer 368. The auxiliary clock multiplexer 368 receives the servo clock signal from the servo clock generator 360 and the read/write clock signal from the read/write clock generator 362. The clock signals may be used to control the time and duration of the diagnostic testing and the read/write operation.

The view DAC 370 and auxiliary DAC 374 may be used to provide diagnostic testing of the read/write channel 308. The auxiliary ADC 374 receives a diagnostic input voltage through the multiplex I/O terminal 392. The auxiliary ADC 374 converts the diagnostic input voltage into a diagnostic output signal, which goes to the digital part (not shown) of the read/write channel 308. The view DAC 370 receives and converts a diagnostic input signal into an analog output voltage. The view DAC 370 may have a resolution of about seven bits. The diagnostic input signal may represent the operating performance of one or more components in the read/write channel or one or more components external to the read/write channel. The view DAC 370 provides the analog output voltage to the analog multiplexer 378. The analog multiplexer 378 provides the analog output voltage to the pin driver buffer 380 along with one or more analog test signals 382, 384, 386, and 388 from components in the read/write channel. The analog test signals may comprise one or more of the amplified signal 382 from the VGA 324, the offset-corrected signal 389 from the summation device 366, the filtered signal 386 from the CTF 328, and the processed signal 388 prior to the ADC 332. The pin driver buffer 380 may comprise one or more high-speed pin driver buffers. The pin driver buffer 380 may pass the analog output voltage and one or more analog test signals 382, 384, 386, and 388 through the multiplex I/O terminal 392.

Other signals may pass through the multiplex I/O terminal 392 and multiple signals may pass through the multiplex I/O terminal 390. The write output driver 352 may convert write data into a write output signal, which passes through the multiplex I/O terminal 392. The test bus switches 376 may pass DC test signals into and out of the multiplex I/O terminal 392. The magnetically generated analog signal may pass from the read/write head (not shown), through the multiplex I/O terminal 390, into the impedance and squelch control 322. An analog service signal also may pass along the same path as the magnetically generated analog signal.

To stage the multiplex transmission of signals through the multiplex I/O terminals 390 and 392, the write output driver 352 and the pin driver buffer 380 may have a disable or power down input controlled through a register bit from the digital part (not shown) of the read/write channel. In one aspect, the disable or power-down input may force the output of the write output driver 352 and pin driver buffer 380 to high impedance, thus blocking the output of the analog output voltage and test signals and the output of the write output signal. The test bus switches 376 also may be activated to block the output DC test signals. With no output from the write output driver 352, pin driver buffers 380, and test bus switches 376, the diagnostic input voltage may pass from outside the read/write channel 308 through the multiplex I/O terminal 392 to the auxiliary ADC 374. In addition, the source or controller of external input signals may be used to stop the input of the external signals through the multiplex I/O terminals 390 and 392. The external input signals include the diagnostic input voltage, input DC test signals, the magnetically generated analog signal, and the analog service signal.

Other combinations are possible for staging the multiplex transmission of signals through the multiplex I/O terminals 390 and 392. In one aspect, output signals from the write output driver 352 and the test bus switches 376 are blocked along with external signals to permit the analog output voltage and the test signals from the analog multiplexer 378 to pass through the multiplex I/O terminal 392. In another aspect, output signals from the pin driver buffer 380 and the test bus switches 376 are blocked along with external signals to permit the write output signal from the write output driver 352 to pass through the multiplex I/O terminal 392. In yet another aspect, output signals from the pin driver buffer 380 and the write output driver 352 are blocked along with external signals to permit the output DC test signal from the test enable switch 376 to pass through the multiplex I/O terminal 392. In a further aspect, output signals from the pin driver buffer 380 and the write output driver 352 are blocked and test bus switches 376 are activated to permit the input DC test signal from outside the read/write channel 308 to pass through the multiplex I/O terminal 392. Other configurations and components may be used to stage transmit the signals through the multiplex I/O terminals 390 and 392.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A disk drive having a read/write channel implemented on an integrated circuit, comprising:

a multiplex input/output (I/O) terminal coupled to at least one read/write head,     a write output driver coupled to provide a write output signal to the multiplex I/O terminal, and a digital to analog converter coupled to provide an analog output voltage to the multiplex I/O terminal.

2. The disk drive according to claim 1, where the multiplex input/output (I/O) terminal has two pins.

3. The disk drive according to claim 1, where the write output signal and analog output voltage are transmitted through the multiplex I/O terminal at different times.

4. The disk drive according to claim 1, where the read/write channel further comprises:
an analog multiplexer coupled to receive the analog output voltage from the digital to analog converter, where the analog multiplexer is coupled to receive at least one test signal from the read/write channel; and
a pin driver buffer coupled to receive the analog output voltage and the at least one test signal from the analog multiplexer, where the pin driver buffer is coupled to provide the analog output voltage and the at least one test voltage to the multiplex I/O terminal.

5. The disk drive according to claim 4, where the read/write channel further comprises:
a variable gain amplifier (VGA) coupled to receive a magnetically-generated signal from the at least one read/write head;
a magnetic resistive asymmetry (MRA) linearizer coupled to receive an amplified signal from the VGA;
a summation device coupled to combine an adjusted signal from the MRA linearizer with an offset correction signal from an offset correction digital to analog converter;
a continuous time filter (CTF) coupled to receive an offset-corrected adjusted signal from the summation device;
a gain amplifier coupled to receive a filtered signal from the CTF; and
an analog to digital converter coupled to receive a processed signal from the gain amplifier,
where the at least one test signal is at least one of the amplified signal, the offset-corrected adjusted signal, the filtered signal, and the processed signal.

6. The disk drive according to claim 5, where the variable gain amplifier (VGA) is coupled to receive the magnetically generated signal and an analog service signal through a second multiplex I/O converter.

7. The disk drive according to claim 1, where the read/write channel further comprises an analog to digital converter (ADC) coupled to receive a diagnostic input voltage through the multiplex I/O terminal, the ADC to provide a diagnostic output signal in response to the diagnostic input voltage.

8. The disk drive according to claim 7, where the read/write channel further comprises a digital part to receive the diagnostic output signal from the ADC, and where the digital part provides the diagnostic input signal to the digital to analog converter.

9. The disk drive according to claim 1, where the read/write channel further comprises a test enable switch coupled to the multiplex I/O terminal, the test enable switch to provide an output DC test signal to the multiplex I/O terminal, the test enable switch to receive an input DC test signal through the multiplex I/O terminal.

10. The disk drive according to claim 1, where the integrated circuit comprises a complementary metal oxide semiconductor.

11. The disk drive according to claim 1, where the read/write channel comprises partial response maximum likelihood (PRML) encoding and decoding.

12. A read/write channel for a disk drive, where the read/write channel is implemented on an integrated circuit, the read/write channel comprising:
a multiplex input/output (I/O) terminal;
a write output driver coupled to provide a write output signal to the multiplex I/O terminal;
a digital to analog converter coupled to provide an analog output voltage to the multiplex I/O terminal;
an analog to digital converter (ADC) coupled to receive a diagnostic input voltage through the multiplex I/O terminal, the ADC to provide a diagnostic output signal in response to the diagnostic input voltage; and
a test enable switch coupled to the multiplex I/O terminal, the test enable switch to provide an output DC test signal to the multiplex I/O terminal, the test enable switch to receive an input DC test signal through the multiplex I/O terminal.

13. The read/write channel according to claim 12, where the write output signal, the analog output voltage, the diagnostic input voltage, and DC test signals are transmitted through the multiplex I/O terminal at different times.

14. The read/write channel according to claim 12, where the read/write channel further comprises:
an analog multiplexer coupled to receive the analog output voltage from the digital to analog converter, where the analog multiplexer is coupled to receive at least one test signal from the read/write channel; and
a pin driver buffer coupled to receive the analog output voltage and the at least one test signal from the analog multiplexer, where the pin driver buffer is coupled to provide the analog output voltage and the at least one test voltage to the multiplex I/O terminal.

15. The read/write channel according to claim 12, further comprising a variable gain amplifier (VGA) coupled to receive a magnetically generated signal and an analog service signal through a second multiplex I/O converter.

16. The read/write channel according to claim 12, further comprising a test enable switch coupled to the multiplex I/O terminal, the test enable switch to provide an output DC test signal to the multiplex I/O terminal, the test enable switch to receive an input DC test signal through the multiplex I/O terminal.

17. A read/write channel for a disk drive, where the read/write channel has partial response maximum likelihood (PRML) encoding and decoding, and where the read/write channel is implemented on a complementary metal oxide semiconductor, the read/write channel comprising:
a first multiplex input/output (I/O) terminal;
a write output driver coupled to provide a write output signal to the first multiplex I/O terminal;
a digital to analog converter coupled to provide an analog output voltage to the first multiplex I/O terminal;
an analog to digital converter (ADC) coupled to receive a diagnostic input voltage through the first multiplex I/O terminal, the ADC to provide a diagnostic output signal in response to the diagnostic input voltage; and
a test enable switch coupled to the first multiplex I/O terminal, the test enable switch to provide an output DC test signal to the first multiplex I/O terminal, the test enable switch to receive an input DC test signal through the first multiplex I/O terminal;
a second multiplex input/output (I/O) terminal; and
a variable gain amplifier (VGA) coupled to receive a magnetically generated signal and an analog service signal through the second multiplex I/O converter, where the write output signal, the analog output voltage, the diagnostic input voltage, and DC test signals are transmitted through the first multiplex I/O terminal at different times.

18. The read/write channel according to claim 17, where the read/write channel further comprises:

an analog multiplexer coupled to receive the analog output voltage from the digital to analog converter, where the analog multiplexer is coupled to receive at least one test signal from the read/write channel; and a pin driver buffer coupled to receive the analog output voltage and the at least one test signal from the analog multiplexer, where the pin driver buffer is coupled to provide the analog output voltage and the at least one test voltage to the first multiplex I/O terminal.

19. The read/write channel according to claim 12, where the first multiplex I/O terminal has two pins, and where the second multiplex I/O terminal has two pins.

* * * * *

UNITED STATES PATENT AND TRADEMARK OFFICE
CERTIFICATE OF CORRECTION

PATENT NO. : 6,628,467 B2
DATED : September 30, 2003
INVENTOR(S) : Sasan Cyrusian It is certified that error appears in the above-identified patent and that said Letters Patent is hereby corrected as shown below:

<u>Title page,</u>
Insert Item -- [56] U.S. PATENT DOCUMENTS

| | | |
|---|---|---|
| 5,260,703 B1 | 11/1993 | Nguyen et al. |
| 5,619,659 B1 | 04/1997 | Kikinis et al. |
| 5,922,062 B1 | 07/1999 | Evoy |
| 6,032,213 B1 | 02/2000 | Gulick --. |

Signed and Sealed this

Tenth Day of August, 2004

JON W. DUDAS
*Acting Director of the United States Patent and Trademark Office*